US011804145B2

(12) United States Patent
Ahn

(10) Patent No.: US 11,804,145 B2
(45) Date of Patent: Oct. 31, 2023

(54) METHOD, SYSTEM AND NON-TRANSITORY COMPUTER-READABLE RECORDING MEDIUM FOR PROVIDING LEARNING INFORMATION

(71) Applicant: CLASSCUBE CO., LTD., Seoul (KR)

(72) Inventor: Seong Chan Ahn, Seoul (KR)

(73) Assignee: CLASSCUBE CO., LTD., Seoul (KR)

( * ) Notice: Subject to any disclaimer, the term of this patent is extended or adjusted under 35 U.S.C. 154(b) by 0 days.

(21) Appl. No.: 17/635,102

(22) PCT Filed: Jul. 24, 2020

(86) PCT No.: PCT/KR2020/009818
§ 371 (c)(1),
(2) Date: Feb. 14, 2022

(87) PCT Pub. No.: WO2021/029563
PCT Pub. Date: Feb. 18, 2021

(65) Prior Publication Data
US 2022/0292997 A1    Sep. 15, 2022

(30) Foreign Application Priority Data

Aug. 12, 2019    (KR) .......................... 10-2019-0098358

(51) Int. Cl.
G09B 7/00     (2006.01)
G06Q 50/20    (2012.01)
G09B 19/02    (2006.01)

(52) U.S. Cl.
CPC ............. *G09B 7/00* (2013.01); *G06Q 50/205* (2013.01); *G09B 19/025* (2013.01)

(58) Field of Classification Search
CPC ......... G09B 7/00; G06Q 50/20; G06Q 50/205
See application file for complete search history.

(56) References Cited

U.S. PATENT DOCUMENTS

| 2009/0035733 A1* | 2/2009 | Meitar | G09B 7/00 434/118 |
| 2014/0272889 A1* | 9/2014 | Kulkarni | G09B 5/08 434/350 |

(Continued)

FOREIGN PATENT DOCUMENTS

| KR | 1020120096659 A | 8/2012 |
| KR | 1020140033902 A | 3/2014 |

(Continued)

OTHER PUBLICATIONS

International Search Report of PCT/KR2020/009818 dated Nov. 13, 2020.

*Primary Examiner* — Eddy Saint-Vil
(74) *Attorney, Agent, or Firm* — Dinsmore & Shohl LLP; Yongsok Choi

(57) ABSTRACT

A method for providing learning information is provided. The method includes the steps of: combining achievements of one or more learner groups for a plurality of learning units to derive learning achievement characteristic information of the one or more learner groups; combining achievements of a target learner for the plurality of learning units to derive learning achievement characteristic information of the target learner; comparing the learning achievement characteristic information of the target learner and the learning achievement characteristic information of the one or more learner groups; and providing learning information to the target learner according to a learning path of the one or more learner groups, on the basis of a result of the comparison.

4 Claims, 5 Drawing Sheets

(56) References Cited

U.S. PATENT DOCUMENTS

2014/0335497 A1* 11/2014 Gal .................... G09B 7/00
                                                434/323
2018/0240015 A1* 8/2018 Martin ................ G09B 7/00
2018/0247549 A1* 8/2018 Martin ................ G09B 7/02

FOREIGN PATENT DOCUMENTS

| KR | 101581921 B1 | 12/2015 |
| KR | 101629084 B1 | 6/2016 |
| KR | 101927357 B1 | 12/2018 |

* cited by examiner

METHOD, SYSTEM AND NON-TRANSITORY COMPUTER-READABLE RECORDING MEDIUM FOR PROVIDING LEARNING INFORMATION

CROSS-REFERENCE TO RELATED APPLICATION(S)

This application is a continuation application of Patent Cooperation Treaty (PCT) International Application No. PCT/KR2020/009818 filed on Jul. 24, 2020, which claims priority to Korean Patent Application No. 10-2019-0098358 filed on Aug. 12, 2019. The entire contents of PCT International Application No. PCT/KR2020/009818 and Korean Patent Application No. 10-2019-0098358 are hereby incorporated by reference.

FIELD OF THE INVENTION

The present invention relates to a method, system, and non-transitory computer-readable recording medium for providing learning information.

BACKGROUND

With the development of information and communication technology, various learning methods are emerging which allow a learner to make progress in learning according to his/her own conditions, contrary to traditional learning methods in which a learner actually meets a teacher to perform learning through the guidance of the teacher.

As an example of related conventional techniques, Korean Laid-Open Patent Publication No. 2011-18109 discloses a technique characterized by featuring: a data input unit for receiving first problem data including a content of a problem; a verification unit for outputting the content of the problem in the first problem data and receiving first solution data for the outputted content of the problem in the first problem data; an analysis unit for calculating a problem difficulty, a discrimination degree, and a guessing degree of the first problem data from the first solution data on the basis of an item response theory; a fit assessment unit for causing the first problem data to be stored in a learning database when the discrimination degree and the guessing degree satisfy a predetermined fit criterion; a problem presentation unit for outputting a content of a problem in second problem data stored in the learning database; a result processing unit for receiving second solution data for the outputted content of the problem in the second problem data to produce a test result, and determining a learning difficulty according to the test result; and a learning unit for outputting a content of a problem in third problem data stored in the learning database and having a problem difficulty equal to the learning difficulty, wherein a plurality of pieces of problem data whose discrimination degree and guessing degree satisfy the fit criterion are stored in the learning database.

However, according to the techniques introduced so far as well as the above-described conventional technique, learning information appropriate for a learner is provided only on the basis of the learner's own learning achievement, and information on learning experiences of other learners having learning tendencies similar to that of the learner (e.g., information on whether learning effect is good when a certain type of problem is solved by other learners having learning tendencies similar to that of the learner) is not fully utilized.

In this connection, the inventor(s) present a technique for providing optimized learning information to a learner by utilizing information on learning experiences of other learners having learning tendencies similar to that of the learner.

SUMMARY OF THE INVENTION

One object of the present invention is to solve all the above-described problems in prior art.

Another object of the invention is to provide optimized learning information to a learner with reference to a learning path of a learner group having a learning tendency similar to that of the learner.

Yet another object of the invention is to: combine achievements of one or more learner groups for a plurality of learning units to derive learning achievement characteristic information of the one or more learner groups; combine achievements of a target learner for the plurality of learning units to derive learning achievement characteristic information of the target learner; compare the learning achievement characteristic information of the target learner and the learning achievement characteristic information of the one or more learner groups; and provide learning information to the target learner according to a learning path of the one or more learner groups, on the basis of a result of the comparison.

The representative configurations of the invention to achieve the above objects are described below.

According to one aspect of the invention, there is provided a method for providing learning information, the method comprising the steps of: combining achievements of one or more learner groups for a plurality of learning units to derive learning achievement characteristic information of the one or more learner groups; combining achievements of a target learner for the plurality of learning units to derive learning achievement characteristic information of the target learner; comparing the learning achievement characteristic information of the target learner and the learning achievement characteristic information of the one or more learner groups; and providing learning information to the target learner according to a learning path of the one or more learner groups, on the basis of a result of the comparison.

According to another aspect of the invention, there is provided a system for providing learning information, the system comprising: a learning achievement characteristic information management unit configured to combine achievements of one or more learner groups for a plurality of learning units to derive learning achievement characteristic information of the one or more learner groups, and to combine achievements of a target learner for the plurality of learning units to derive learning achievement characteristic information of the target learner; a learning achievement characteristic information comparison unit configured to compare the learning achievement characteristic information of the target learner and the learning achievement characteristic information of the one or more learner groups; and a learning information provision unit configured to provide learning information to the target learner according to a learning path of the one or more learner groups, on the basis of a result of the comparison.

In addition, there are further provided other methods and systems to implement the invention, as well as non-transitory computer-readable recording media having stored thereon computer programs for executing the methods.

According to the invention, it is possible to provide optimized learning information to a learner with reference to a learning path of a learner group having a learning tendency similar to that of the learner, thereby improving learning efficiency.

DETAILED DESCRIPTION

Figure 1:
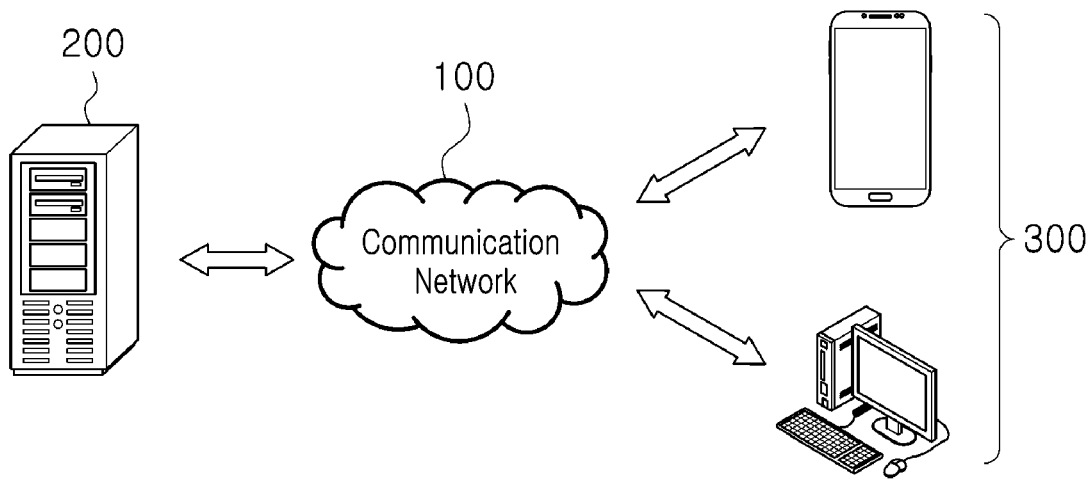
FIG. 1 schematically shows the configuration of an entire system for providing learning information according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

A learning unit according to the invention refers to a unit for which a learner's learning achievement may be quantitatively assessed, and may be defined on the basis of a subject, a grade, and a curriculum unit, for example. Further, according to one embodiment of the invention, the learning unit may include a specific curriculum unit (e.g., linear expressions) of a specific subject (e.g., mathematics) or a plurality of subparts (e.g., definition of a linear expression, addition and subtraction of linear expressions, and the like) included in the specific curriculum unit. However, the learning unit according to the invention is not limited to those mentioned above, and may be diversely changed as long as the objects of the invention may be achieved.

Learning achievement characteristic information according to the invention may refer to information obtained by combining learning achievements of a learner (or a learner group) for a plurality of learning units. Further, a learning achievement characteristic image according to the invention may refer to an image by which the learning achievement characteristic information is correspondingly represented.

Figure 3:
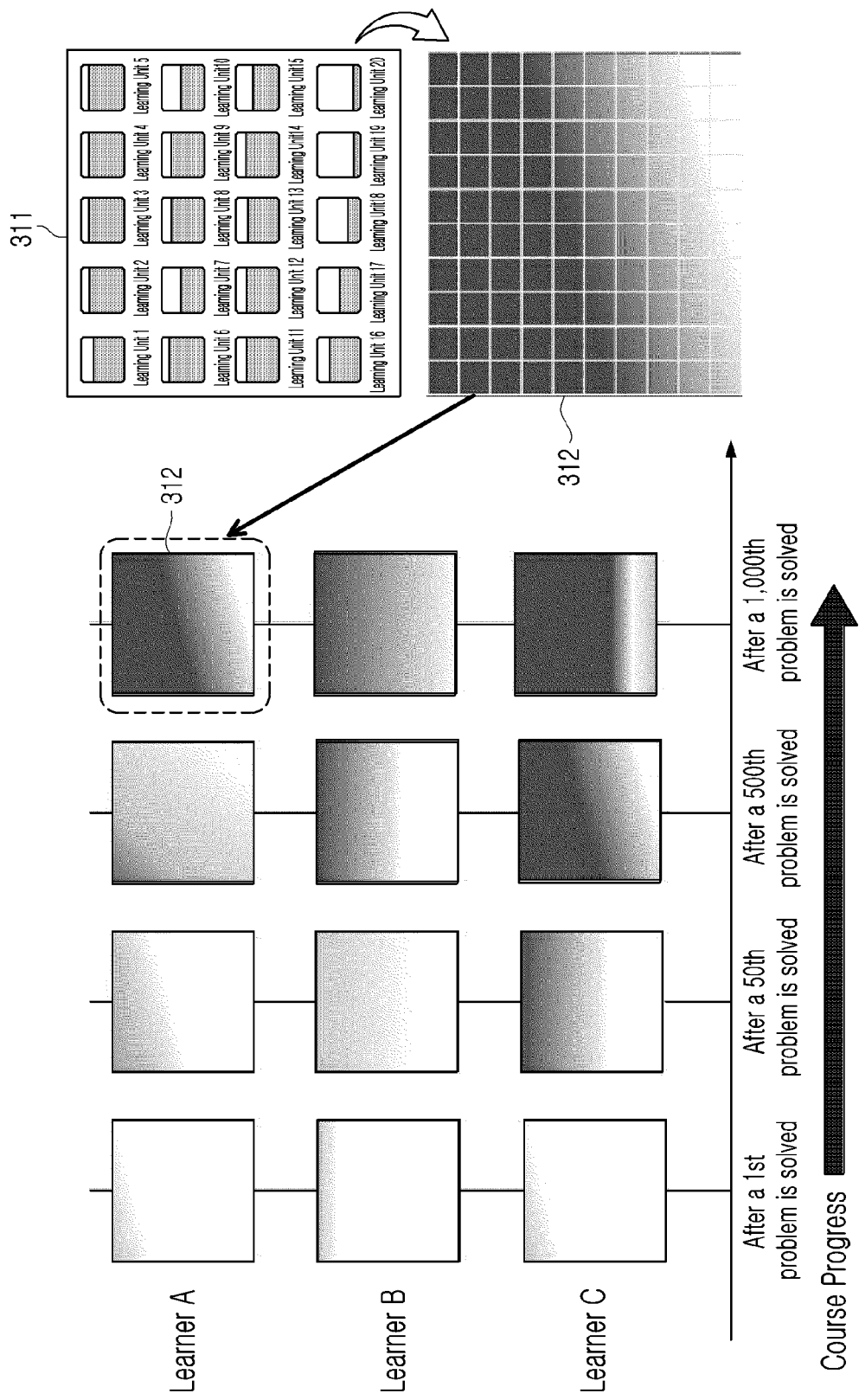
FIG. 3 illustratively shows learning achievement characteristic information and a corresponding learning achievement characteristic image according to one embodiment of the invention.

FIG. 3 illustratively shows learning achievement characteristic information and a corresponding learning achievement characteristic image according to one embodiment of the invention.

For example, referring to FIG. 3, it can be seen that learning achievement characteristic information 311 of a learner A and a corresponding learning achievement characteristic image 312 of the learner A are visually represented according to one embodiment of the invention. That is, according to one embodiment of the invention, the learning achievement characteristic information 311 of the learner A may be derived by combining learning achievements of the learner A for a plurality of learning units, and the corresponding learning achievement characteristic image 312 of the learner A may be derived on the basis of the derived learning achievement characteristic information 311 of the learner A. For example, the learning achievement of the learner A for each of the plurality of learning units may correspond to one cell or one pixel of the learning achievement characteristic image 312 of the learner A.

Configuration of an Entire System

FIG. 1 schematically shows the configuration of an entire system for providing learning information according to one embodiment of the invention.

As shown in FIG. 1, the entire system according to one embodiment of the invention may comprise a communication network 100, a learning information provision system 200, and a device 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television networks.

Next, the learning information provision system 200 according to one embodiment of the invention may function to: combine achievements of one or more learner groups for a plurality of learning units to derive learning achievement characteristic information of the one or more learner groups; combine achievements of a target learner for the plurality of learning units to derive learning achievement characteristic information of the target learner; compare the learning achievement characteristic information of the target learner and the learning achievement characteristic information of the one or more learner groups; and provide learning information to the target learner according to a learning path of the one or more learner groups, on the basis of a result of the comparison.

The configuration and functions of the learning information provision system 200 according to the invention will be discussed in detail in the following description.

Next, the device 300 according to one embodiment of the invention is digital equipment capable of connecting to and then communicating with the learning information provision system 200, and any type of digital equipment having a microprocessor and a memory means for computing capabilities, such as smart phones, tablets, smart watches, smart bands, smart glasses, desktop computers, notebook computers, workstations, personal digital assistants (PDAs), web pads, and mobile phones, may be adopted as the device 300 according to the invention.

Particularly, the device 300 may include an application (not shown) to assist in receiving services such as learning information provision from the learning information provision system 200. The application may be downloaded from the learning information provision system 200 or a known web server (not shown).

Configuration of the Learning Information Provision System

Hereinafter, the internal configuration of the learning information provision system 200 crucial for implementing the invention and the functions of the respective components thereof will be discussed.

Figure 2:
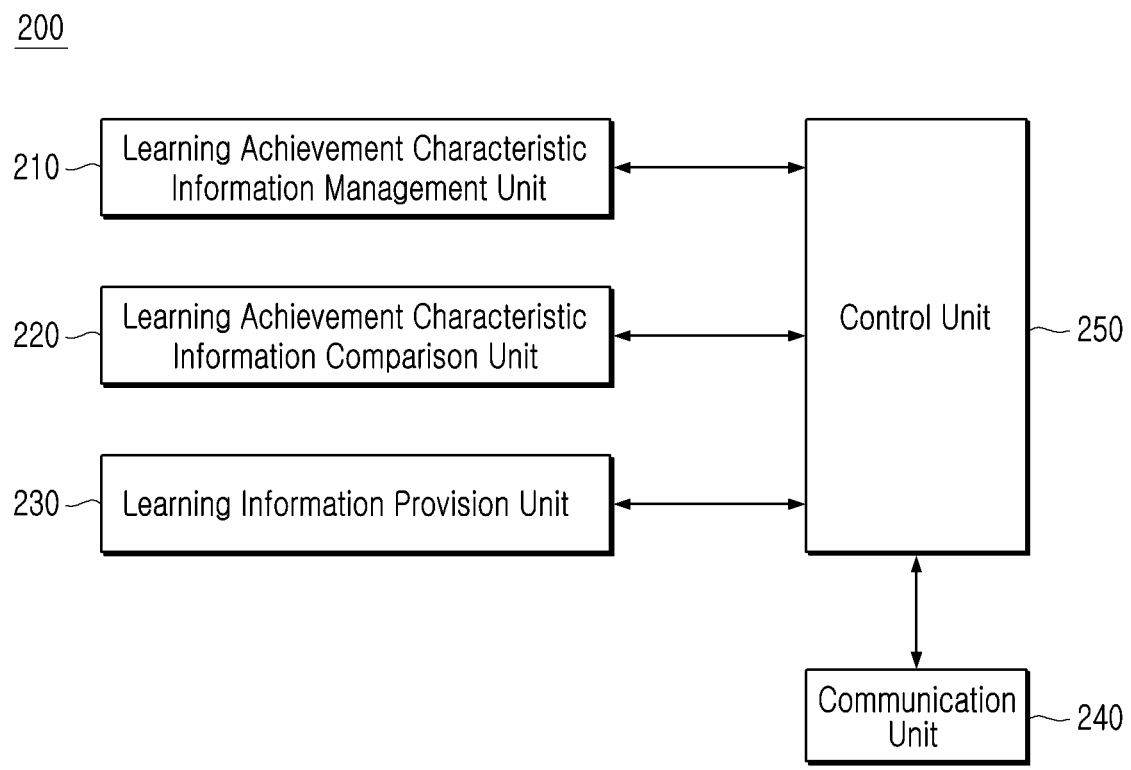
FIG. 2 specifically shows the internal configuration of a learning information provision system according to one embodiment of the invention.

FIG. 2 specifically shows the internal configuration of the learning information provision system 200 according to one embodiment of the invention.

As shown in FIG. 2, the learning information provision system 200 according to one embodiment of the invention may comprise a learning achievement characteristic information management unit 210, a learning achievement characteristic information comparison unit 220, a learning information provision unit 230, a communication unit 240, and a control unit 250. According to one embodiment of the invention, at least some of the learning achievement characteristic information management unit 210, the learning achievement characteristic information comparison unit 220, the learning information provision unit 230, the communication unit 240, and the control unit 250 may be program modules to communicate with an external system. The program modules may be included in the learning information provision system 200 in the form of operating systems, application program modules, or other program modules, while they may be physically stored in a variety of commonly known storage devices. Further, the program modules may also be stored in a remote storage device that may communicate with the learning information provision system 200. Meanwhile, such program modules may include, but are not limited to, routines, subroutines, programs, objects, components, data structures, and the like for performing specific tasks or executing specific abstract data types as will be described below in accordance with the invention.

Meanwhile, the above description is illustrative although the learning information provision system 200 has been described as above, and it will be apparent to those skilled in the art that at least a part of the components or functions of the learning information provision system 200 may be implemented or included in an external system (not shown), as necessary.

First, the learning achievement characteristic information management unit 210 according to one embodiment of the invention may function to derive and store learning achievement characteristic information of one or more learner groups.

Specifically, the learning achievement characteristic information management unit 210 according to one embodiment of the invention may function to combine achievements of one or more learner groups for a plurality of learning units to derive learning achievement characteristic information of the one or more learner groups, and store the derived learning achievement characteristic information. Meanwhile, it should be understood that a learner group according to the invention encompasses one or more learners.

Further, the learning achievement characteristic information management unit 210 according to one embodiment of the invention may function to derive, on the basis of the learning achievement characteristic information of the one or more learner groups, a corresponding learning achievement characteristic image of the one or more learner groups, and store the derived learning achievement characteristic image.

Meanwhile, the learning achievement characteristic information and the corresponding learning achievement characteristic image of the one or more learner groups according to one embodiment of the invention may be dynamically changed as learning of the one or more learner groups proceeds. Further, the learning achievement characteristic information management unit 210 according to one embodiment of the invention may function to store how the learning achievement characteristic information and the corresponding learning achievement characteristic image of the one or more learner groups are changed. For example, the learning achievement characteristic information management unit 210 according to one embodiment of the invention may store the learning achievement characteristic information when a first problem is solved, when a 50th problem is solved, when a 500th problem is solved, and when a 1,000th problem is solved, respectively.

Figure 4:
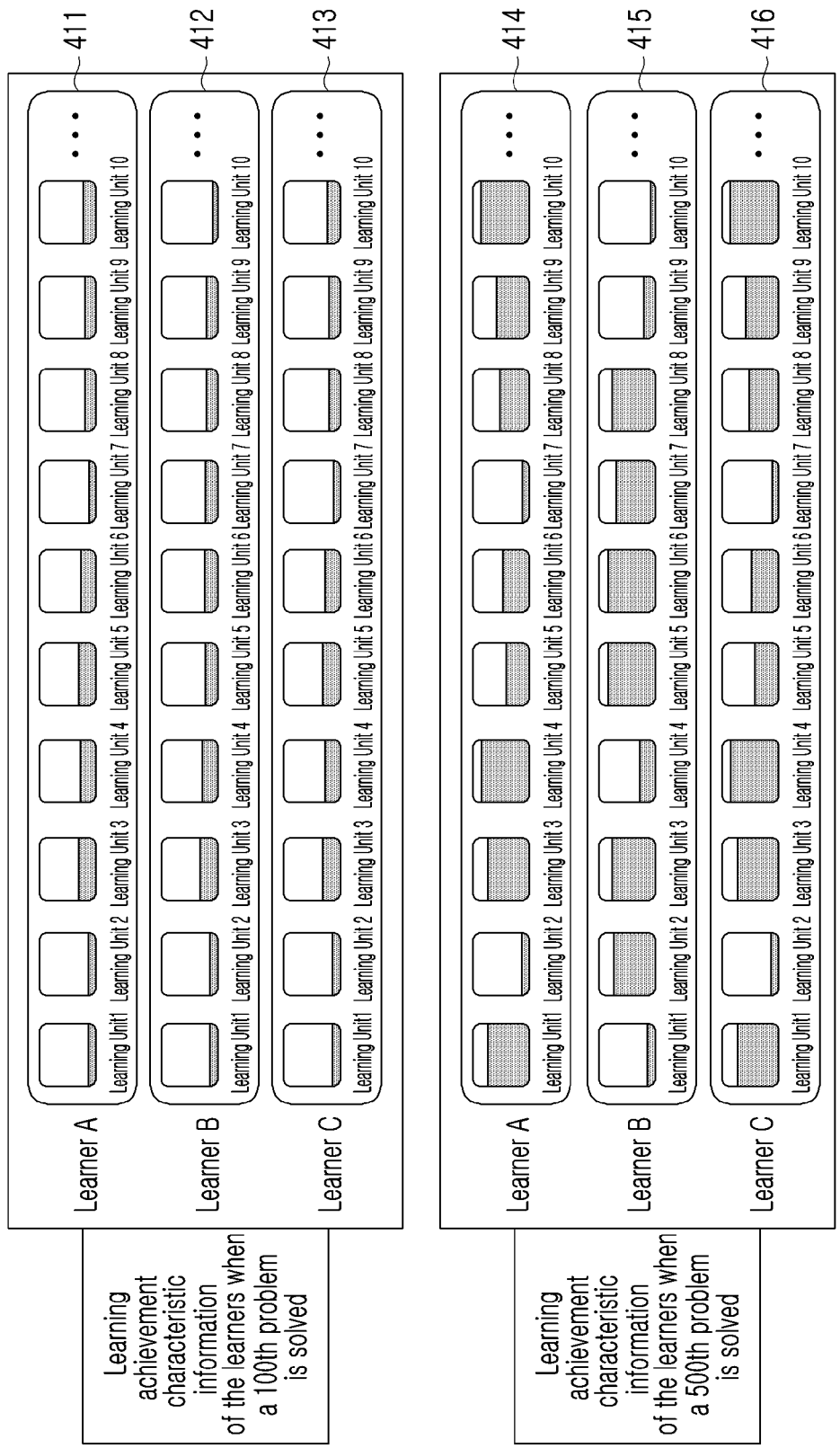
FIG. 4 illustratively shows how learning achievement characteristic information according to one embodiment of the invention is dynamically changed.

FIG. 4 illustratively shows how learning achievement characteristic information according to one embodiment of the invention is dynamically changed.

For example, referring to FIG. 4, it can be seen that learning achievements of learners A, B, and C for a plurality of learning units increase as the number of problems solved by each learner increases, and learning achievement characteristic information of each learner is consequently changed. That is, learning achievement characteristic information 411 to 413 of the learners A, B, and C when a 100th problem is solved may differ from learning achievement characteristic information 414 to 416 of the learners A, B, and C when a 500th problem is solved. Therefore, it is apparent to those skilled in the art that learning achievement characteristic images of the learners A, B, and C corresponding to the learning achievement characteristic information 411 to 413 of the learners A, B, and C when the 100th problem is solved may differ from learning achievement characteristic images of the learners A, B, and C corresponding to the learning achievement characteristic information 414 to 416 of the learners A, B, and C when the 500th problem is solved.

Next, the learning achievement characteristic information comparison unit 220 according to one embodiment of the invention may function to compare learning achievement characteristic information of a target learner and the learning achievement characteristic information of the one or more learner groups. Meanwhile, the target learner may refer to a learner who is to receive learning information using the learning information provision system 200.

Specifically, the learning achievement characteristic information management unit 210 according to one embodiment of the invention may combine achievements of the target learner for the plurality of learning units to derive the learning achievement characteristic information of the target learner. Further, the learning achievement characteristic information comparison unit 220 according to one embodiment of the invention may function to compare the derived learning achievement characteristic information of the target learner and the learning achievement characteristic information of the one or more learner groups to calculate similarity between the derived learning achievement characteristic information of the target learner and the learning achievement characteristic information of the one or more learner groups, and derive one or more learner groups for which the calculated similarity is at or above a predetermined level, as a result of the comparison.

In addition, the learning achievement characteristic information comparison unit 220 according to one embodiment of the invention may function to compare a learning achievement characteristic image corresponding to the learning achievement characteristic information of the one or more learner groups and a learning achievement characteristic image corresponding to the learning achievement characteristic information of the target learner to calculate similarity between the learning achievement characteristic information of the target learner and the learning achievement characteristic information of the one or more learner groups.

Figure 5:
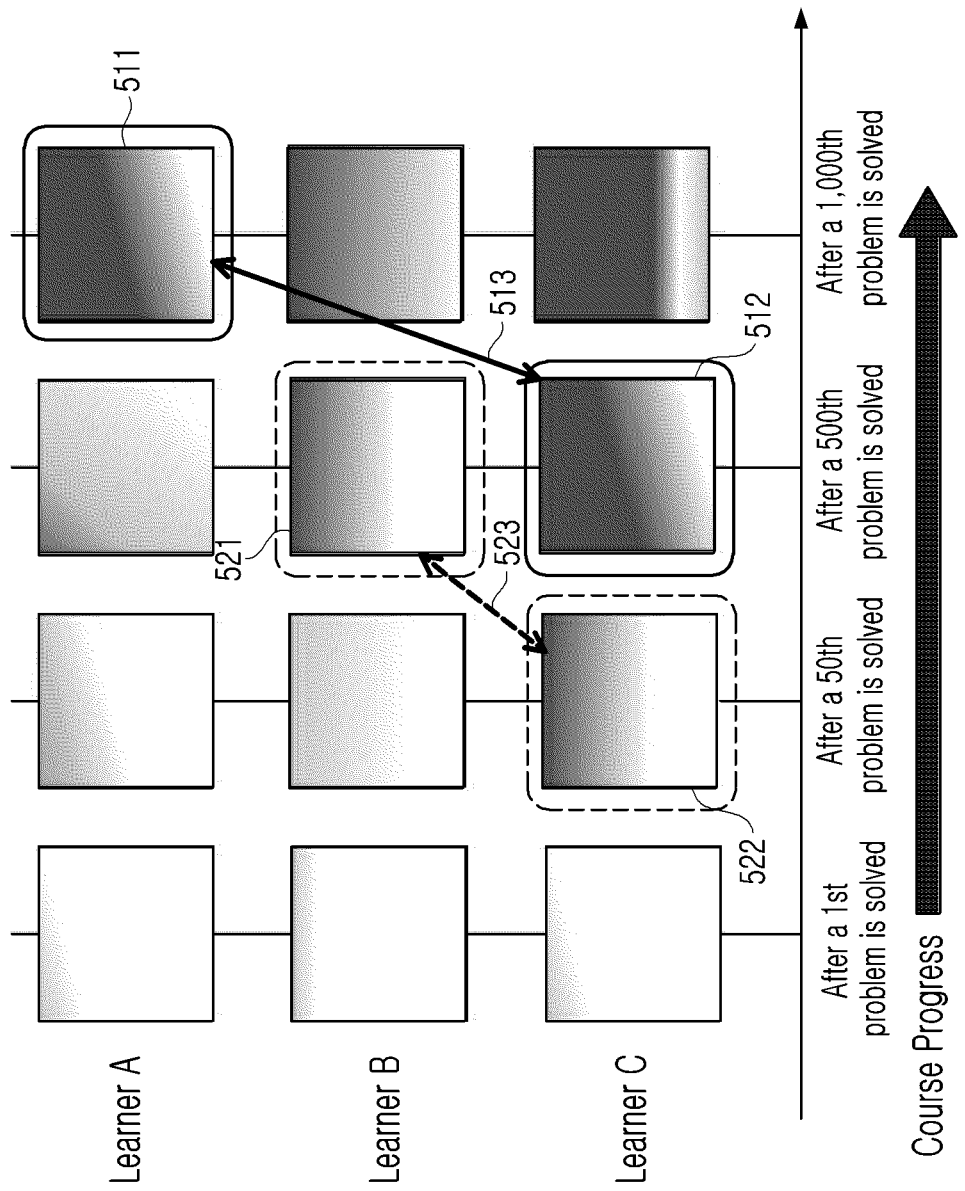
FIG. 5 illustratively shows how to compare learning achievement characteristic information according to one embodiment of the invention.

FIG. 5 illustratively shows how to compare learning achievement characteristic information according to one embodiment of the invention.

For example, referring to FIG. 5, it may be assumed that a learner A is a target learner. In this case, the learning achievement characteristic information comparison unit 220 according to one embodiment of the invention may compare 513 a learning achievement characteristic image 511 of the learner A when the learner A solves a 1,000th problem and a learning achievement characteristic image 512 of a learner C when the learner C solves a 500th problem to derive a conclusion that similarity between learning achievement characteristic information of the learner A when the learner A solves the 1,000th problem and learning achievement characteristic information of the learner C when the learner C solves the 500th problem is at or above a predetermined level. Further, the learning achievement characteristic information comparison unit 220 according to one embodiment of the invention may function to cause the learner C to be included in one or more learner groups for which the similarity is at or above the predetermined level, which are derived as a result of the comparison.

As another example, referring to FIG. 5, it may be assumed that a learner B is a target learner. In this case, the learning achievement characteristic information comparison unit 220 according to one embodiment of the invention may compare 523 a learning achievement characteristic image 521 of the learner B when the learner B solves a 500th problem and a learning achievement characteristic image 522 of the learner C when the learner C solves a 50th problem to derive a conclusion that similarity between learning achievement characteristic information of the learner B when the learner B solves the 500th problem and learning achievement characteristic information of the learner C when the learner C solves the 50th problem is at or above a predetermined level. Further, the learning achievement characteristic information comparison unit 220 according to one embodiment of the invention may function to cause the learner C to be included in one or more learner groups for which the similarity is at or above the predetermined level, which are derived as a result of the comparison.

Next, the learning information provision unit 230 according to one embodiment of the invention may function to provide learning information to the target learner according to a learning path of the one or more learner groups, on the basis of a result of the learning achievement characteristic information comparison unit 220 comparing the learning achievement characteristic information of the target learner and the learning achievement characteristic information of the one or more learner groups.

Specifically, when the learning achievement characteristic information comparison unit 220 according to one embodiment of the invention derives one or more learner groups whose learning achievement characteristic information is similar to the learning achievement characteristic information of the target learner at or above a predetermined level, the learning information provision unit 230 according to one embodiment of the invention may function to provide learning information to the target learner with reference to a learning path of the one or more learner groups for which the similarity is at or above the predetermined level (i.e., the learner group having a learning tendency similar to that of the target learner).

Meanwhile, the learning information according to one embodiment of the invention may include problems, textbooks, learning videos, and the like for increasing the learning achievements of the target learner. However, the learning information according to the invention is not limited to those mentioned above, and may be diversely changed as long as the objects of the invention may be achieved.

Further, according to one embodiment of the invention, the learning path of one or more learner groups whose learning achievement characteristic information is similar to the learning achievement characteristic information of the target learner at or above a predetermined level, which is referred to by the learning information provision unit 230 to provide learning information to the target learner, may include a learning path for each learning unit, a learning path for each assessment domain, a learning path for each assessment domain for each of the plurality of learning units, and the like. Here, the assessment domain according to one embodiment of the invention refers to assessment items by which learning capability of a learner may be determined. For example, in the case of a mathematics subject, the assessment domain may include computational ability, comprehension ability, problem solving ability, reasoning ability, and the like. However, the learning path and the assessment domain according to the invention are not limited to those mentioned above, and may be diversely changed as long as the objects of the invention may be achieved.

Meanwhile, the learning information provision unit 230 according to one embodiment of the invention may function to determine the learning information to be provided to the target learner, on the basis of at least one of a number of problems solved by one or more learner groups whose learning achievement characteristic information is similar to the learning achievement characteristic information of the target learner at or above a predetermined level, types of the problems solved by the one or more learner groups, a learning achievement increase rate of the one or more learner groups (e.g., a learning achievement increase rate after the problems are solved by the one or more learner groups), and a learning achievement compared to a target achievement (i.e., an achievement to be reached for each of the plurality of learning units) of the one or more learner groups.

Further, a number of problems solved by one or more learner groups whose learning achievement characteristic information is similar to the learning achievement characteristic information of the target learner at or above a predetermined level, types of the problems solved by the one or more learner groups, a learning achievement increase rate of the one or more learner groups, and a learning achievement compared to a target achievement of the one or more learner groups may be individually considered for each learning unit, each assessment domain, or each assessment domain for each of the plurality of learning units.

Figure 6:
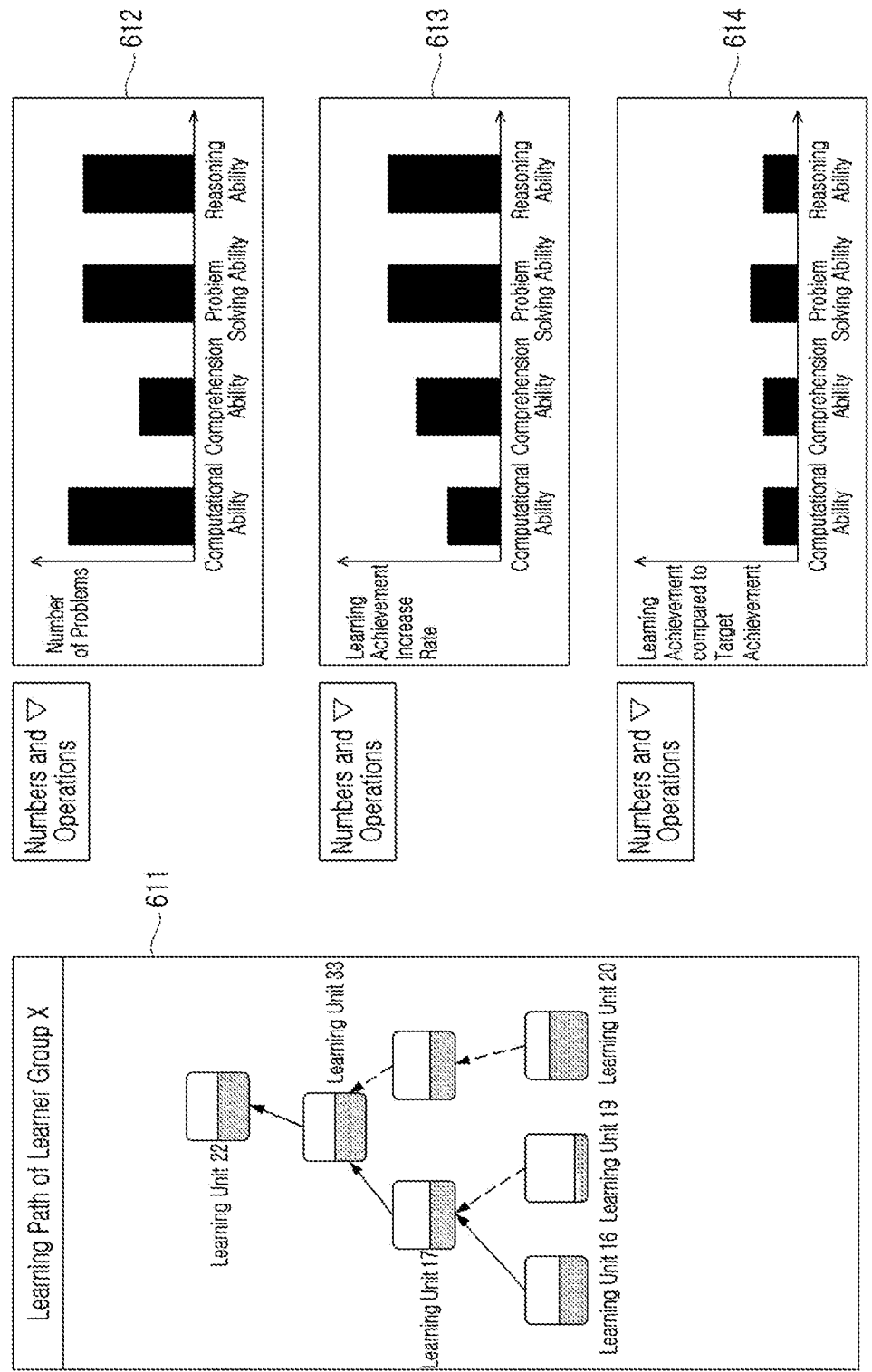
FIG. 6 illustratively shows how to refer to a learning path of a learner group to provide learning information according to one embodiment of the invention.

FIG. 6 illustratively shows how to refer to a learning path of a learner group to provide learning information according to one embodiment of the invention.

For example, referring to FIG. 6, it may be assumed that a learner group X is derived as a learner group whose learning achievement characteristic information is similar to learning achievement characteristic information of a target learner at or above a predetermined level, with respect to a plurality of learning units included in a "Numbers and Operations" section of a mathematics subject. In this case, information on a number of problems for each assessment domain 612 solved by the learner group X in the "Numbers and Operations" section, a learning achievement increase rate for each assessment domain 613 after the problems are solved by the learner group X in the "Numbers and Operations" section, and a learning achievement compared to a target achievement for each assessment domain 614 of the learner group X in the "Numbers and Operations" section may be acquired with reference to a learning path 611 experienced by the learner group X in the "Numbers and Operations" section.

Referring further to FIG. 6, information indicating that the learner group X has solved more problems related to computational ability than problems related to comprehension ability in the "Numbers and Operations" section, but a learning achievement increase rate for a plurality of learning units included in the "Numbers and Operations" section is greater when the problems related to comprehension ability are solved than when the problems related to computational ability are solved may be acquired. The information may mean that providing the problems related to comprehension ability rather than the problems related to computational ability in the "Numbers and Operations" section is an efficient learning method for a target learner having a learning tendency similar to that of the learner group X. Therefore, the learning information provision unit 230 according to one embodiment of the invention may function to provide learning information related to comprehension ability to the target learner, in order to efficiently increase learning achievements of the target learner for the plurality of learning units included in the "Numbers and Operations" section.

In addition, the learning information provision unit 230 according to one embodiment of the invention may function to provide learning information to the target learner with reference to a learning path of a learner who has increased his/her learning achievement most efficiently, among one or more learners included in one or more learner groups whose learning achievement characteristic information is similar to the learning achievement characteristic information of the target learner at or above a predetermined level.

For example, when learning information related to comprehension ability is to be provided to the target learner in consideration of a learning tendency of the target learner, the learning information provision unit 230 according to one embodiment of the invention may function to provide the target learner with problems solved by a learner who has solved the smallest number of problems related to comprehension ability, among one or more learners who have reached target achievements and are included in a learner group having a learning tendency similar to that of the target learner.

Although some embodiments have been described above, the present invention is not necessarily limited to the aforementioned embodiments. It is noted that any learnable subjects regardless of courses or fields may be learning units according to the invention.

Next, the communication unit 240 according to one embodiment of the invention may function to enable data transmission/reception from/to the learning achievement characteristic information management unit 210, the learning achievement characteristic information comparison unit 220, and the learning information provision unit 230.

Lastly, the control unit 250 according to one embodiment of the invention may function to control data flow among the learning achievement characteristic information management unit 210, the learning achievement characteristic information comparison unit 220, the learning information provision unit 230, and the communication unit 240. That is, the control unit 250 according to the invention may control data flow into/out of the learning information provision system 200 or data flow among the respective components of the learning information provision system 200, such that the learning achievement characteristic information management unit 210, the learning achievement characteristic information comparison unit 220, the learning information provision unit 230, and the communication unit 240 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method performed in a system for providing learning information, the method comprising the steps of:

combining achievements of one or more learner groups for a plurality of learning units to derive learning achievement characteristic information of the one or more learner groups and a learning achievement characteristic image of the one or more learning groups corresponding to the learning achievement characteristic information of the one or more learner groups;

combining achievements of a target learner for the plurality of learning units to derive learning achievement characteristic information of the target learner and a learning achievement characteristic image of the target learner corresponding to the learning achievement characteristic information of the target learner;

dynamically changing pixels of the learning achievement characteristic image of the one or more learning groups and pixels of the learning achievement characteristic image of the target learner on the basis of inputs from the one or more learning groups and inputs from the target learner, respectively;

comparing the learning achievement characteristic image of the target learner and the learning achievement characteristic image of the one or more learner groups to calculate similarity between the learning achievement characteristic information of the target learner and the learning achievement characteristic information of the one or more learner groups; and determining a learner group for which the similarity is at or above a predetermined level, from among the one or more learner groups, and providing learning information to the target learner with reference to a learning path of a learner who has increased the learner's learning achievement most efficiently, among one or more learners included in the determined learner group.

2. The method of claim 1, wherein in the providing step, the learning information is determined on the basis of at least one of a number of problems solved by the determined learner group, types of the problems solved by the determined learner group, a learning achievement increase rate of the determined learner group, and a learning achievement compared to a target achievement of the determined learner group.

3. A non-transitory computer-readable recording medium having stored thereon a computer program for executing the method of claim 1.

4. A system for providing learning information, the system comprising:

a learning achievement characteristic information management unit configured to combine achievements of one or more learner groups for a plurality of learning units to derive learning achievement characteristic information of the one or more learner groups and a learning achievement characteristic image of the one or more learning groups corresponding to the learning achievement characteristic information of the one or more learner groups, to combine achievements of a target learner for the plurality of learning units to derive learning achievement characteristic information of the target learner and a learning achievement characteristic image of the target learner corresponding to the learning achievement characteristic information of the target learner, and to dynamically change pixels of the learning achievement characteristic image of the one or more learning groups and pixels of the learning achievement characteristic image of the target learner on the basis of inputs from the one or more learning groups and inputs from the target learner, respectively;

a learning achievement characteristic information comparison unit configured to compare the learning achievement characteristic image of the target learner and the learning achievement characteristic image of the one or more learner groups to calculate similarity between the learning achievement characteristic information of the target learner and the learning achievement characteristic information of the one or more learner groups; and a learning information provision unit configured to determine a learner group for which the similarity is at or above a predetermined level, from among the one or more learner groups, and to provide learning information to the target learner with reference to a learning path of a learner who has increased the learner's learning achievement most efficiently, among one ore more learners included in the determined learner group.

* * * * *